(12) United States Patent
Kawabata et al.

(10) Patent No.: US 7,817,521 B2
(45) Date of Patent: Oct. 19, 2010

(54) OPTICAL DISC DEVICE CONFIGURED TO DETECT ABNORMAL LOADING STATUS

(75) Inventors: Toru Kawabata, Osaka (JP); Makoto Maruoka, Ehime (JP)

(73) Assignee: Panasonic Corporation, Osaka (JP)

( * ) Notice: Subject to any disclaimer, the term of this patent is extended or adjusted under 35 U.S.C. 154(b) by 772 days.

(21) Appl. No.: 11/719,499

(22) PCT Filed: Nov. 15, 2005

(86) PCT No.: PCT/JP2005/020920
§ 371 (c)(1),
(2), (4) Date: May 16, 2007

(87) PCT Pub. No.: WO2006/054539
PCT Pub. Date: May 26, 2006

(65) Prior Publication Data
US 2009/0150913 A1    Jun. 11, 2009

(30) Foreign Application Priority Data
Nov. 17, 2004    (JP) .............................. 2004-332992

(51) Int. Cl.
*G11B 20/18*    (2006.01)
(52) U.S. Cl. .................. 369/53.42; 369/53.12
(58) Field of Classification Search .............. 369/53.43, 369/53.12, 53.42, 53.41, 53.11; 720/612, 720/601, 611, 602
See application file for complete search history.

(56) References Cited

U.S. PATENT DOCUMENTS

| | | | | |
|---|---|---|---|---|
| 4,723,234 A | * | 2/1988 | Katsuyama et al. | 369/53.28 |
| 5,119,356 A | * | 6/1992 | Matsuoka et al. | 369/53.2 |
| 5,140,575 A | * | 8/1992 | Fushiki | 369/44.32 |
| 5,388,094 A | * | 2/1995 | Park | 720/710 |
| 5,574,711 A | * | 11/1996 | Nakamichi | 720/602 |
| 5,796,697 A | * | 8/1998 | Masaki et al. | 720/659 |

(Continued)

FOREIGN PATENT DOCUMENTS

| | | |
|---|---|---|
| JP | 60055545 | 3/1985 |
| JP | 04143964 | 5/1992 |
| JP | 06275008 | 9/1994 |
| JP | 07176121 | 7/1995 |
| JP | 09091821 | 4/1997 |
| JP | 09320173 | 12/1997 |

OTHER PUBLICATIONS

PCT International Search Report dated Feb. 21, 2006.

*Primary Examiner*—Tan X Dinh
(74) *Attorney, Agent, or Firm*—Dickinson Wright PLLC (57) ABSTRACT

An information recording/reproducing device is provided with a tray (3) having holders (2, 4) for holding a disc (9) on a disc placing part (11) by permitting the disc to overhang on a part of the disc placing part (11) in a vertically laid status. The information recording/reproducing device is provided with a means for detecting an abnormally mounted status, wherein the disc (9) is placed on the disc placing part (11) through the holding holders (2, 4), by comparing a number of rotations or load torque measured at a prescribed time after a rotating means (8) is started, a measured time required for the number of rotations to reach a fixed number of rotations or a drive current measured when the number of rotations became the prescribed umber of rotations, with a previously stored threshold value. Thus, detection of the abnormally mounted status can be completed for the disc prior to starting recording or reproducing operation.

13 Claims, 6 Drawing Sheets

U.S. PATENT DOCUMENTS 5,815,487 A * 9/1998 Fujisawa .................... 720/731
5,878,013 A    3/1999 Maeda et al.
6,587,412 B1 * 7/2003 Matsuo et al. ........... 369/53.12
7,424,724 B2 * 9/2008 Miroku et al. .............. 720/606

* cited by examiner

OPTICAL DISC DEVICE CONFIGURED TO DETECT ABNORMAL LOADING STATUS

TECHNICAL FIELD

The present invention relates to various types of information recording/reproducing devices using a disk-like recording medium such as CD, DVD, or the like.

BACKGROUND ART

A disk loading device for loading a disk is provided at a information recording/reproducing device, such as a compact disk (hereinafter referred to as "CD") player, CD drive, digital versatile disk (hereinafter referred to as "DVD") RON drive, DVD audio player, DVD recorder, or the like, using various types of disk-like recording mediums (hereinafter referred to as "disk"). The mainstream of the construction of the disk loading device is that, when the disk handled by the information recording/reproducing device is placed on a tray that is drawn out from the device in the disk loading device, this tray is moved to the inside of the device, stored therein, and then, automatically clamped by a turntable that rotates the disk, thereby completing the preparation for recording and reproduction.

On the other hand, chances have recently been increasing wherein this type of information recording/reproducing device is installed and used with the state in which the surface of the disk becomes vertical, for space saving. Therefore, the information recording/reproducing device is commonly designed such that it can be used even with the state in which the disk is horizontally placed or with the state in which the disk is vertically placed. In case where the device is installed such that the disk is horizontally placed, the disk is stably placed on the tray, so that there is no problem. However, in case where the device is installed such that the disk is vertically placed, the disk is naturally slipped off from the tray with this state, so that the disk cannot be placed on the tray. Therefore, a projection of some kind is provided at the section of the tray corresponding to the outer periphery of the disk, whereby the disk can beheld by this projection at generally the same relative position with respect to the tray as the case of horizontally placing the disk. By carrying out the loading operation of the disk with this state, the loading operation is performed in the same manner as in the case of horizontally placing the disk. However, in order to stably load the disk in a vertical state with this structure, this projection has to take the shape of overhanging toward the neighborhood of the inside or toward the inside of the outer periphery of the disk.

The overhanging shape does not matter in the case of vertically installing the device. However, in the case of horizontally installing the device, the disk has to be placed as slipped under the projection upon placing the disk on the tray, which means that the disk cannot be placed on the tray with a simple operation. If the disk is erroneously placed on the overhanging section without being slipped under the projection, the disk is not properly loaded on the tray. As a result, not only a proper recording/reproduction cannot be performed by the information recording/reproducing device, but also, in extreme cases, there may arise a case of entailing a fatal result as the information recording/reproducing device, the example of which is that the disk slides with this projection upon rotating the disk to thereby damage the disk, causing the destroy of recording data of a user.

Accordingly, attention is called in an operation manual of the device, or a structure is taken in which this overhanging section can be housed when the device is horizontally installed and used. However, in this measure, whether the above-mentioned fatal result can be avoided or not depends upon the action of the user, thereby entailing a problem that this measure is by no means sufficient.

With respect to this problem, a method has been conventionally proposed wherein the rotation number of the disk is counted after a predetermined time from the start of the rotation upon the start of the rotation of the disk, determines whether the disk is properly loaded to the information recording/reproducing device, and executes an appropriate operation when it is determined to be abnormal, as disclosed in the Reference(Patent Document 1). Since the torque of the motor and the inertia moment of the disk and the rotator of the motor fall within a certain range, the rotation number after the predetermined time from the start of the rotation falls within some fixed range, in case where the disk is properly loaded. In case where the rotation number is outside this range, it is determined that the disk is not properly loaded, so that the operation such as drawing out the tray is executed.

[Patent Document 1] Japanese Unexamined Patent Application No. HEI7-176121

DISCLOSURE OF THE INVENTION

Problems to be Solved by the Invention

The aforesaid Reference relates to a case wherein the disk motor races due to the abnormality in loading the disk and the rotation number becomes greater than the predetermined value. However, in the abnormality in which the disk is overhung on the projection, the disk comes in contact with, for example, a housing or the like of the information recording/reproducing device, so that the ordinary rotation number is reduced due to friction force caused by the contact to the housing or the like. It is needless to say that the detection of abnormality is similarly possible even in such case.

The structure disclosed in the above-mentioned Reference entails a problem stated below in order to detect the abnormality even in case where the rotation number is reduced.

In order to detect the abnormality in loading the disk, the disk should be rotated. The first problem is that the disk may be damaged by this rotation.

The reduction in the rotation number is caused by the friction force between the aforesaid projection and the disk, wherein the variation in the friction force is great. The second problem is that, considering the above-mentioned fact, there may be a case wherein the abnormality cannot be determined by providing a constant threshold value in the rotation number.

The third problem is as follows. In the case of the device, such as DVD-RAM drive, handling a disk contained in a cartridge, the cartridge cannot be placed on the tray when the projection is kept to be protruding from the tray, upon using the cartridge. Therefore, the structure may frequently be adopted in which the projection is kept to be protruding from the tray by urging force of urging means such as a spring or the like. With this structure, the projection is held at a predetermined position for holding the disk in case where the cartridge is not placed. On the other hand, when the cartridge is placed, the urging means is compressed by the own weight of the cartridge exerted against the urging force of the urging means, whereby the projection is housed under the surface of the tray (i.e., the projection is subsided from the tray). This spring has to be compressed by the own weight or the like of the cartridge, so that the urging force should be set small. On the other hand, when the disk is placed thereon, the disk is held by the projection protruded by this small urging force. In view of this, it is required that the friction force generated between the subsiding operation and the protruding operation of the projection is set small, and further, it is required to set a threshold value to the friction force for regulating the subsiding operation and protruding operation. However, achieving both requirements is difficult.

The present invention relates to a detection of an abnormality in a disk loading state, and aims to solve the conventional subjects.

Means for Solving the Problems

A information recording/reproducing device according to the present invention is provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, comprising rotating means for rotating the disk; rotation number measuring means for measuring the rotation number of the rotating means; counting means for counting an elapsed time from the start of the rotating means; data storing means that stores beforehand a threshold value for detecting an abnormal loading state of the disk placed on the disk placing section via the holder according to the rotation number of the rotating means at the time when the elapsed time counted by the counting means reaches a predetermined time; and comparing means that compares the rotation number measured by the rotation number measuring means and the threshold value stored beforehand in the data storing means, when the predetermined time has elapsed from the start of the rotating means, and outputs an abnormality detecting signal when the rotation number is smaller.

Another information recording/reproducing device according to the present invention is provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, comprising rotating means for rotating the disk; torque measuring means for measuring the load torque required by the rotating means for rotating the disk; counting means for counting an elapsed time from the start of the rotating means; data storing means that stores beforehand a threshold value for detecting an abnormal loading state of the disk placed on the disk placing section via the holder according to the load torque required by the rotating means at the time when the elapsed time counted by the counting means reaches a predetermined time; and comparing means that compares the load torque measured by the torque measuring means and the threshold value stored beforehand in the data storing means, when the predetermined time has elapsed from the start of the rotating means, and outputs an abnormality detecting signal when the load torque is greater.

In the above-mentioned structure, the holder is a disk holder that is urged by a spring in a direction vertical to the placing face of the tray and that is retractable from the placing face of the tray as pushed by the cartridge placed on the placing face of the tray, wherein rotation restricting means for restricting the rotation of the disk by the rotating means upon the abnormal loading state of the disk is provided at the section of the holder that comes in contact with the disk.

In the foregoing structure, the rotation restricting means is made of a material having adsorptivity to the disk when brought into contact with the disk.

In the foregoing structure, the abnormal loading is detected during the time from the loading operation of the disk to the time when the recording or reproduction of the information is performed to the disk.

In the foregoing structure, the torque measuring means further measures the generating torque generated by the rotating means, wherein the generating torque of the rotating means measured by the torque measuring means upon detecting the abnormal loading is smaller than the generating torque of the rotating means upon recording or reproducing the information to the disk.

In the foregoing structure, the generating torque measured by the torque measuring means upon detecting the abnormal loading is torque that is free from damaging the disk upon detecting the abnormal loading.

In the foregoing structure, the generating torque measured by the torque measuring means upon detecting the abnormal loading has a value incapable of rotating the disk when the disk is abnormally loaded and capable of rotating the disk when the disk is properly loaded.

Still another information recording/reproducing device according to the present invention is provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, comprising rotating means for rotating the disk; rotation number measuring means for measuring the rotation number of the rotating means; counting means for counting an elapsed time from the start of the rotating means; data storing means that stores beforehand a threshold value for detecting an abnormal loading state of the disk placed on the disk placing section via the holder according to the elapsed time counted by the counting means from the start of the rotating means until the rotation number measured by the rotation number counting means reaches a fixed rotation number; and comparing means that compares the elapsed time counted by the counting means from the start of the rotating means until the rotation number measured by the rotation number counting means reaches a fixed rotation number and the threshold value stored beforehand in the data storing means, and outputs an abnormality detecting signal when the elapsed time is longer.

Still another information recording/reproducing device according to the present invention is provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, comprising rotating means for rotating the disk; rotation number measuring means for measuring the rotation number of the rotating means; drive current measuring means for measuring drive current corresponding to the rotation number of the rotating means; data storing means that stores beforehand a threshold value for detecting an abnormal loading state of the disk placed on the disk placing section via the holder according to the drive current measured by the drive current measuring means when the rotation number measured by the rotation number measuring means reaches a predetermined rotation number; and comparing means that compares the drive current measured by the drive current measuring means when the rotation number measured by the rotation number measuring means reaches a predetermined rotation number and the threshold value stored beforehand in the data storing means, and outputs an abnormality detecting signal when the drive current is greater.

EFFECT OF THE INVENTION

According to a information recording/reproducing device of the present invention, a disk is not damaged even if the detecting operation is performed with the abnormal loading state of the disk.

Further, the rotation load is increased by the rotation restricting means, whereby the difference in the rotation number is increased, compared to the case of properly loading the disk, resulting in that the abnormal loading can easily be detected.

DESCRIPTION OF THE REFERENCE CHARACTERS

1 Housing
2 Main bar
3 Tray
4 Disk holder
5 Rubber
6 Clamper
7 Turntable
8 Spindle motor
9 Disk
10 Pivot support
11 Disk positioning recess serving as a disk placing section
12 Disk holder urging spring
13 Main bar urging spring
14 Comparing means
15 Control means
16 Driving means
17 Counting means
18 Rotation number measuring means
19 Data storing means

BEST MODE FOR CARRYING OUT THE INVENTION

A information recording/reproducing device according to the embodiment of the present invention will be described below with reference to FIGS. 1 to 10.

A best mode of a information recording/reproducing device according to the present invention will be explained hereinafter. The information recording/reproducing device (hereinafter referred to as "disk drive") taken in the following embodiment is a DVD-RAM drive, but it is needless to say that the application of the invention is not limited thereto.

Figure 1:
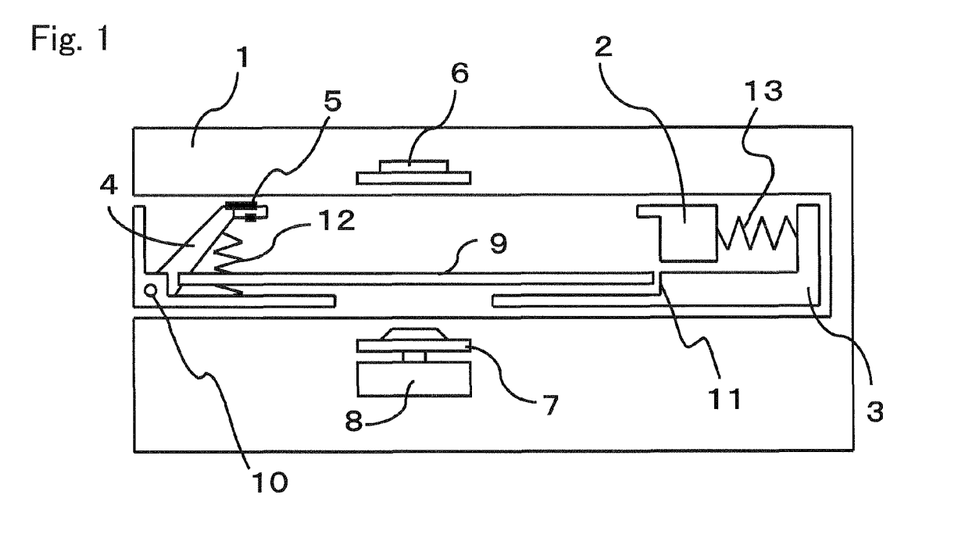
FIG. 1 is a schematic sectional view showing a structure of a information recording/reproducing device before a disk is loaded according to one embodiment of the present invention.
Figure 2:
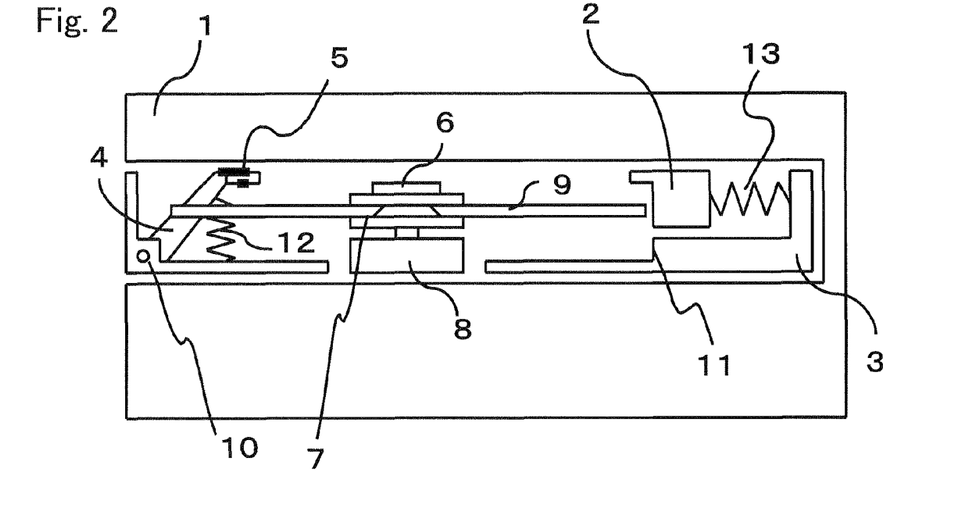
FIG. 2 is a schematic sectional view showing a structure of the same device after the disk is loaded.
Figure 3:
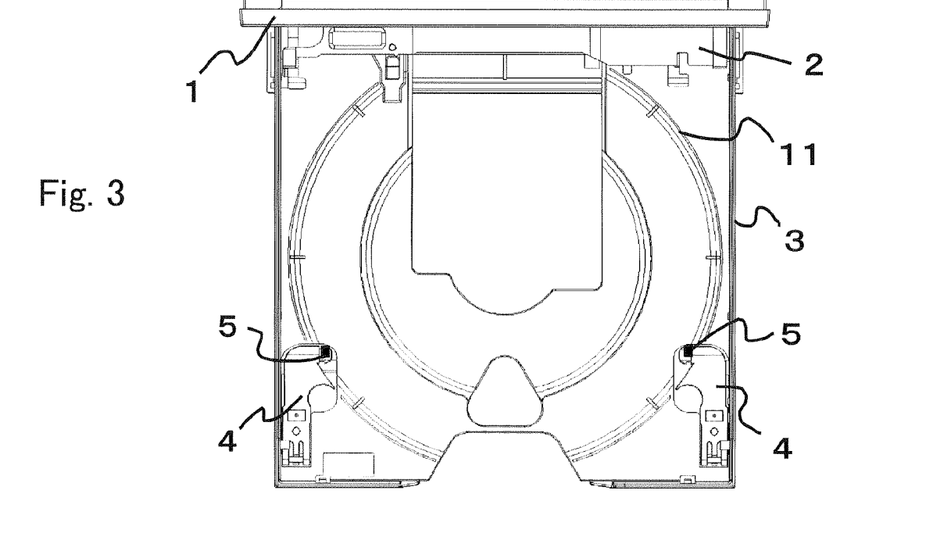
FIG. 3 is a plane view showing a tray section according to the embodiment.
Figure 4:
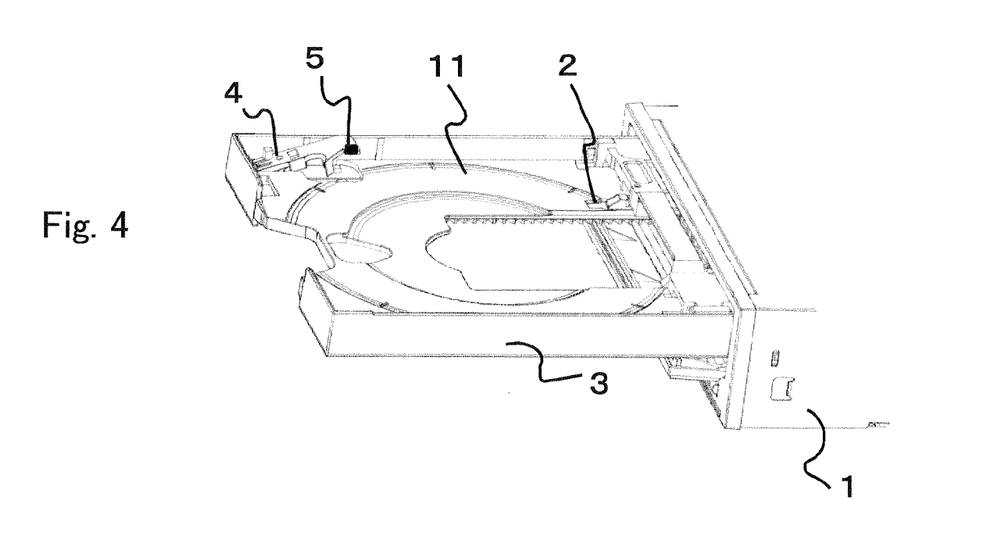
FIG. 4 is a perspective view showing the tray section.
Figure 5:
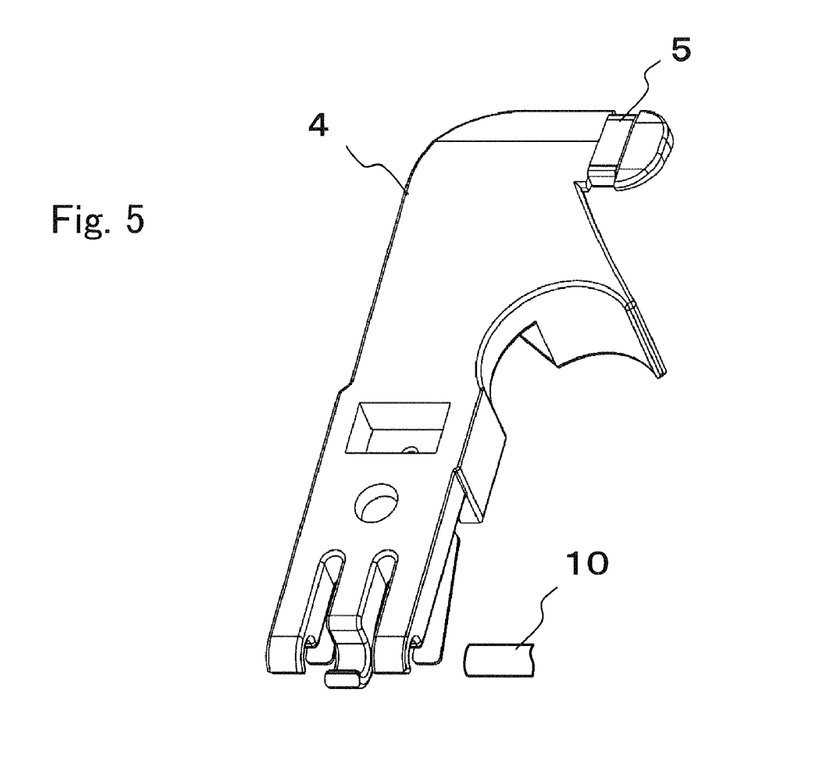
FIG. 5 is enlarged perspective views showing a disk holder shown in FIG. 4.
Figure 6:
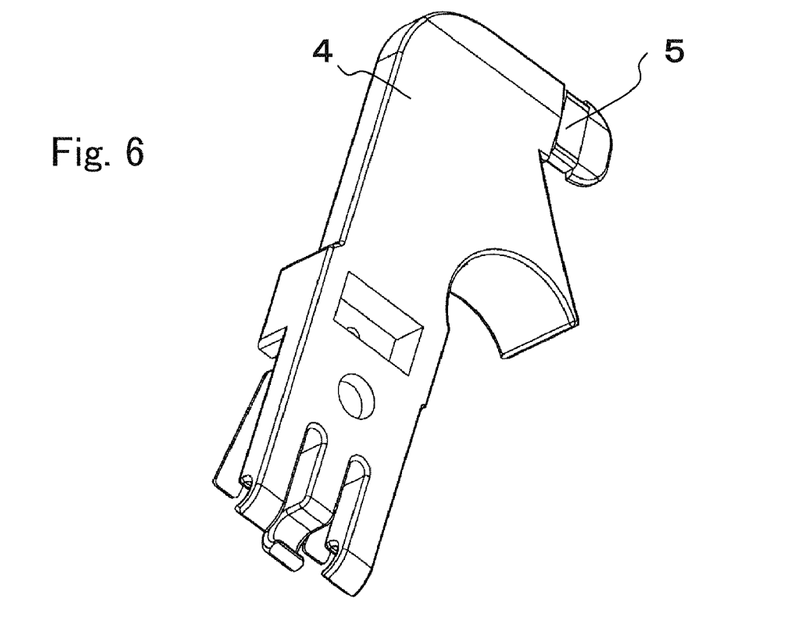
FIG. 6 is enlarged perspective views showing a disk holder shown in FIG. 4 seen from another angle.

FIGS. 1 and 2 are schematic constructional views showing a main part of a loading mechanism according to the embodiment of the present invention. FIG. 1 schematically shows the state wherein a tray is housed in a housing, while FIG. 2 schematically shows the state wherein the disk is clamped by a spindle motor, so that the preparation for recording or reproduction has been completed. Further, FIGS. 3 and 4 are schematic constructional views showing a tray section of the disk drive according to the embodiment of the present invention. FIG. 3 is a plane view, while FIG. 4 is a perspective view. FIGS. 5 and 6 are enlarged perspective views showing this section. The embodiment will be explained hereinafter supposing that the disk drive is a DVD-RAM drive. The DVD-RAM drive accepts not only a recording media not contained in a cartridge, such as CD-A, CD-ROM, CD-R/RW, DVD-ROM, DVD-R/RW, or the like of 8 cm or 12 cm, but also a DVD-RAM disk contained in a cartridge, and can perform recording and reproduction. The device is generally used as installed such that the disk surface becomes horizontal. However, it can be used as installed such that the disk surface becomes vertical according to need of a user.

In FIGS. 1, 2, 3 and 4, numeral 1 denotes a housing, 2 a main bar, 3 a tray, 4 a disk holder, 5 a rubber, 6 a clamper, 7 a turntable, 8 a spindle motor, 9 a disk, 10 a pivot support, 11 a disk positioning recess serving as a disk placing section, 12 a disk holder urging spring and 13 a main bar urging spring.

Figure 7:
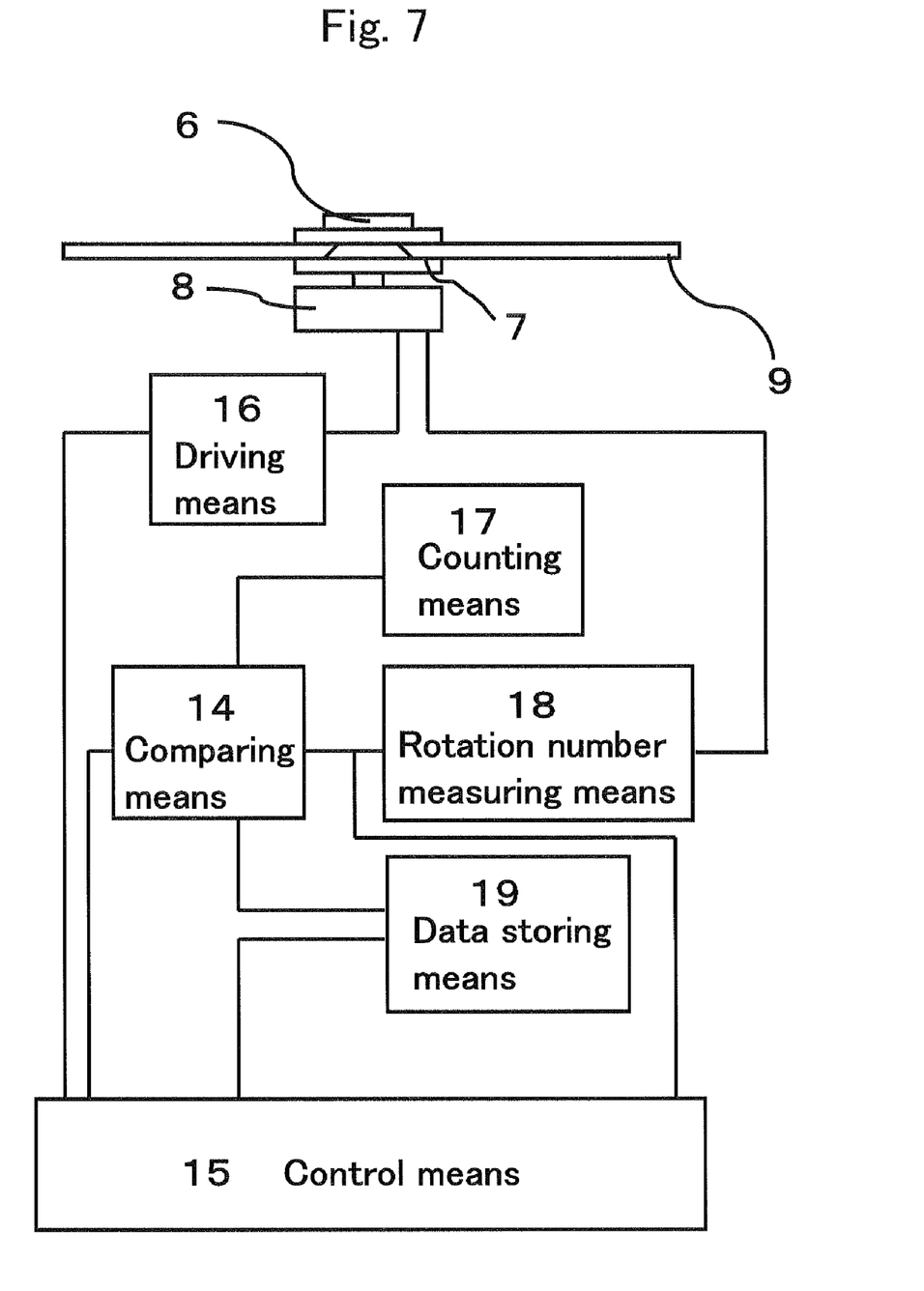
FIG. 7 is a control block diagram according to the embodiment.

Further, FIG. 7 is a control block diagram of the disk drive according to the embodiment. In FIG. 7, numeral 6 denotes the clamper, 7 the turntable, 8 the spindle motor and 9 the disk. These are the same as those in FIGS. 1 and 2 given the same numerals. Moreover, numeral 14 denotes comparing means, 15 control means, 16 drive means, 17 counting means, 18 rotation number measuring means and 19 data storing means.

The disk 9 is placed on the tray 3. As shown in FIG. 3 and 4, the tray 3 is drawn out from the housing 1 by an unillustrated loading mechanism when the disk 9 to which a user intends to perform the recording or reproduction is attempted to be loaded to the disk drive, so that the user can place the disk 9 to which the recording or reproduction is to be performed. When the user uses a bare disk not contained in a cartridge, such as CD-R or the like, he/she places the disk on the tray 3 so as to match to the disk positioning recess 11.

This DVD-RAM drive can also be used as installed such that the disk surface becomes vertical as described above. When it is installed such that the disk surface becomes vertical, the disk 9 cannot be placed on the tray 3. Therefore, an overhanging section above the disk positioning recess 11 that indicates the range for placing the disk 9 is provided at the disk holder 4 and the main bar 2. When the device is installed such that the disk surface becomes vertical, this section prevents the disk 9 from slipping off from the tray 3, whereby the disk 9 is held at generally the position of the disk positioning recess 11.

Since the overhanging section above the disk positioning recess 11 that indicates the range for placing the disk 9 is provided at the disk holder 4 and the main bar 2, the user places the disk 9 so as to slip under the overhanging section, when he/she places the disk 9 on the tray 3.

When the disk contained in the cartridge, such as DVD-RAM disk or the like, is loaded, the disk holder 4 and the main bar 2 interfere with the cartridge with this state. Therefore, the disk holder 4 and the main bar 2 are respectively urged by a disk holder urging spring 12 and a main bar urging spring 13 to be located at a predetermined position. When the disk contained in the cartridge is loaded, the disk holder urging spring 12 is compressed by the own weight of the cartridge, whereby the disk holder 4 pivots about the pivot support 10 to be retracted inwardly from the surface of the tray 3. Similarly, when the cartridge is loaded, it is placed on the tray 3 as the cartridge presses the main bar 2, whereby the main bar urging spring 13 is compressed to retract the main bar 2 to the rear of the cartridge.

The disk holder urging spring 12 has to be compressed by the own weight or the like of the cartridge, so that its urging force is weak. Further, the disk holder 4 is made of a material having satisfactory slidability, since it has a section slidably moving with the tray 3. Therefore, the friction coefficient between the disk holder 4 and the disk 9 is relatively small.

Rotation restricting means for restricting the rotation of the disk 9 upon the abnormal loading of the disk 9 is provided at the section of the disk holder 4 that is in contact with the disk 9. In this embodiment, a rubber 5 is fitted to the disk holder 4 as one example of the rotation restricting means. This rubber 5 does not damage the disk 9 when sliding with the disk 9, and further, the friction coefficient between the rubber 5 and the disk 9 is extremely great, compared to the material of the disk holder 4.

With the state shown in FIG. 2 in which the disk 9 is clamped by the clamper 6 to the spindle motor 8, completing the preparation for the recording or reproduction, the tray 3 is housed in the housing 1 by an unillustrated loading device with the disk 9 placed on the tray 3. The turntable 7 mounted integral with the rotation shaft of the spindle motor 8 moves up from below, whereby the disk 9 is placed on the turntable 7 and separated from the tray 3. Simultaneously, the damper 6 moves down. A magnet is incorporated in the damper 6. This magnet attracts an iron piece incorporated into the turntable 7, so that the disk 9 is brought into pressing contact with the turntable 7 for bringing the disk 9 into a rotatable state with the turntable 7.

The spindle motor 8 is driven by driving means 16 (see FIG. 7). The driving means 16 controls the drive current of the spindle motor 8, thereby being capable of generating a random rotation number or torque to the spindle motor 8. Further, the rotation number measuring means 18 measures its rotation number and the measured rotation number is inputted to the control means 15. Thus, the control means 15 controls the spindle motor 8 so as to rotate with a random rotation number required for the recording or reproduction upon the normal recording/reproduction. These configurations are generally provided at generally all types of optical disk devices. Notably, the counting means 17 counts a time from the start of the spindle motor 8 and outputs the counted value to the comparing means 14.

The data storing means 19 records the data of the rotation number for determining whether the loading state of the disk 9 is proper or not and the torque of the motor for determining whether the disk loading state is proper or not, as the data of the drive current value of the motor 8. The data of the rotation number or torque is outputted to the comparing means 14. Further, the data of the drive current value of the motor is outputted to the control means 15. When recognizing that the a certain fixed time has been elapsed from the start of the spindle motor 8 by the output from the counting means 17, the comparing means 14 compares the output from the rotation number measuring means 18 at this point and the data stored in the data storing means 19, and outputs the result to the control means 15.

The operation of the disk drive thus configured will be explained. The device of this embodiment can be used as installed such that the surface of the disk 9 becomes vertical as described above. Since this device is installed such that the surface of the disk 9 becomes vertical, the overhanging section above the disk positioning recess 11, that indicates the range for placing the disk 9, is provided at the disk holder 4 and the main bar 2. Therefore, the user has to slip the disk 9 under the overhanging section of the disk holder 4 and the main bar 2 when he/she places the disk 9 onto the tray 3.

Figure 9:
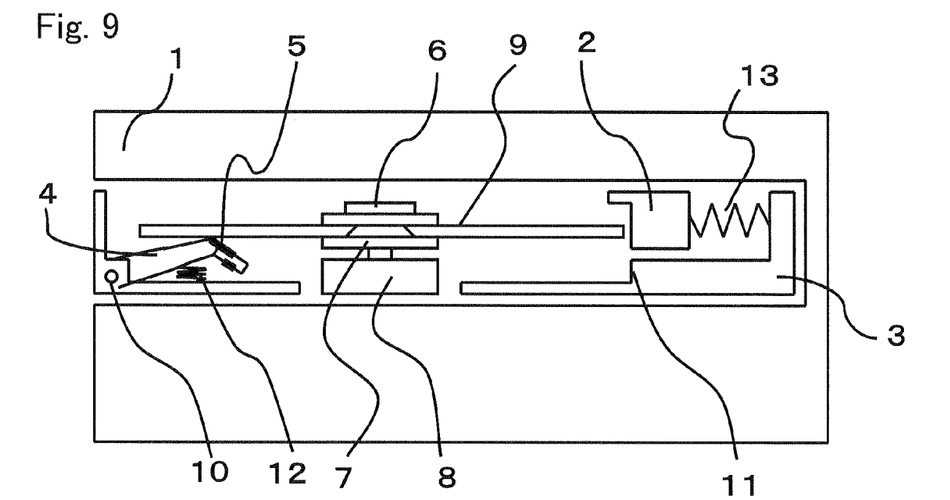
FIG. 9 is a schematic sectional view showing a structure of the device according to the embodiment when the disk is abnormally loaded.

When the disk 9 is loaded on the tray 3, the outer periphery of the disk 9 is brought into contact with the main bar 2 to press the main bar urging spring 13, and then, fitted into the disk positioning recess 11 of the tray 3, whereby there is very little chance of the disk 9 being placed on the main bar 2. However, when the disk 9 is loaded on the tray 3, the disk 9 is loaded from above the disk holder 4 as tilted the disk 9 to the tray 3. Therefore, the user not always places the disk 9 under the overhanging section of the disk holder 4, but he/she might place the disk 9 onto the disk holder 4. Since the turntable 7 fixed to the spindle motor 8 has a slope, the disk 9 is clamped with the turntable 7 and the damper 6, and the drive of the spindle motor 8 is started for normal recording/reproduction even with this state. Specifically, as shown in FIG. 9, there may be the case in which the spindle motor 8 rotates with the disk 9 placed on the disk holder 4 and rotates up to the rotation number required for the recording or reproduction. When the disk 9 rotates with this abnormal loading state, the disk holder 4 and the information face of the disk 9 on which the information signal is recorded or reproduced are brought into contact with each other, thereby damaging the information face of the disk 9.

In order to avoid this damage, the control means 15 has to perform an operation for determining whether the loading state of the disk 9 is abnormal or not when the disk 9 is loaded and before the normal recording or reproduction is started. Therefore, the spindle motor 8 is firstly driven by the driving means 16 on the basis of the data of the rotation number of the motor stored in the data storing means 19. When the drive of the spindle motor 8 is started, the count by the counting means 17 is started. After an elapse of a predetermined time, the rotation number measuring means 18 serving also as the torque measuring means measures the rotation number of the spindle motor 8 at this point, and the comparing means 14 compares the measured value and the data of the rotation number after a predetermined time, that is the threshold value, stored in the data storing means 19 and outputs the result to the control means 15. In the case of the abnormal loading, something comes in contact with the outer periphery of the disk 9, so that the load torque is increased. Therefore, the rotation number reached by the spindle motor within a predetermined time is decreased. Accordingly, it can be determined whether the disk loading state is proper or not by the rotation number after the predetermined time. In case where it is determined that the disk is abnormally loaded, the clamp of the disk 9 is released to discharge the tray 3 from the housing 1.

In this embodiment, in case where the disk 9 runs over the main bar 2, the load torque is greatly increased, so that the determination is relatively easy with this method. However, since the disk holder 4 is urged by the disk holder urging spring 12, the generating friction force is small even if the disk 9 is placed on the disk holder 4. Therefore, the decrease in the rotation number is small, whereby its detection is difficult. In view of this, the rotation restricting means 5 for restricting the rotation of the disk 9 in case where the disk 9 is abnormally placed on the disk holder 4 is provided at the face of the disk holder 4 that comes in contact with the disk 9. Thus, in this embodiment, the comparing means 14 compares the rotation number of when the spindle motor 8 is rotated for a predetermined time and the data of the rotation number stored beforehand in the data storing means 19, thereby being capable of determining whether the disk 9 is properly loaded or not.

Subsequently, the operation of the disk drive according to another embodiment of the present invention will be explained. This embodiment uses a DVD-RAM drive that can be used as installed such that the surface of the disk 9 becomes vertical as described above. Since this device is installed such that surface of the disk 9 becomes vertical, the overhanging section above the disk positioning recess 11, that indicates the range for placing the disk 9, is provided at the disk holder 4 and the main bar 2. Therefore, the user has to slip the disk 9 under the overhanging section of the disk holder 4 and the main bar 2 when he/she places the disk 9 onto the tray 3.

Figure 8:
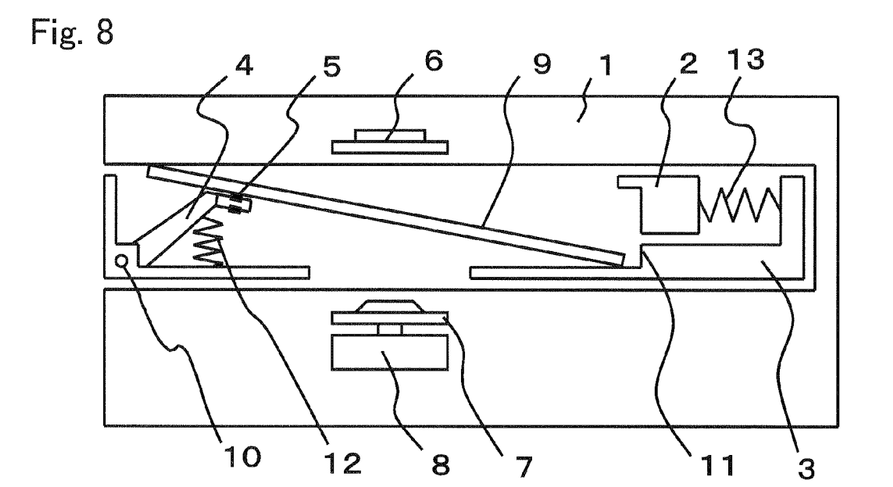
FIG. 8 is a schematic sectional view showing a structure of the device according to the embodiment immediately before the disk is abnormally loaded.

When the disk 9 is loaded on the tray 3, the outer periphery of the disk 9 is brought into contact with the main bar 2 to press the main bar urging spring 13, and then, fitted into the disk positioning recess 11 of the tray 3, whereby there is very little chance of the disk 9 being placed on the main bar 2. However, when the disk 9 is loaded on the tray 3, the disk 9 is loaded from above the disk holder 4 as tilted the disk 9 to the tray 3 as shown in FIG. 8. Therefore, the user not always places the disk 9 under the overhanging section of the disk holder 4, but he/she might place the disk 9 onto the disk holder 4. Since the turntable 7 fixed to the spindle motor 8 has a slope, the disk 9 is clamped with the turntable 7 and the damper 6, and the drive of the spindle motor 8 is started for normal recording/reproduction even with this state. Specifically, as shown in FIG. 9, there may be the case in which the spindle motor 8 rotates with the disk 9 placed on the disk holder 4 and rotates up to the rotation number required for the recording or reproduction. When the disk 9 rotates with this abnormal loading state, the disk holder 4 and the information face of the disk 9 on which the information signal is recorded or reproduced are brought into contact with each other, thereby damaging the information face of the disk 9.

In order to avoid this damage, the control means 15 has to perform an operation for determining whether the loading state of the disk 9 is abnormal or not when the disk 9 is loaded and before the normal recording or reproduction is started. Therefore, the spindle motor 8 is firstly driven by the driving means 16 on the basis of the data of the torque of the motor stored in the data storing means 19. When the drive of the spindle motor 8 is started, the count by the counting means 17 is started. After an elapse of a predetermined time, the rotation number measuring means 18 measures the rotation number of the spindle motor 8 at this point and the load torque required for this rotation number, and the comparing means 14 compares the measured value and the data stored in the data storing means 19 and outputs the result to the control means 15. In the case of the abnormal loading, something comes in contact with the outer periphery of the disk 9, so that the load torque is increased. Accordingly, it can be determined whether the disk loading state is proper or not by the load torque after the predetermined time. In case where it is determined that the disk is abnormally loaded, the clamp of the disk 9 is released to discharge the tray 3 from the housing 1.

In this embodiment, in case where the disk 9 runs over the main bar 2, the load torque is greatly increased, so that the determination is relatively easy with this method. However, since the disk holder 4 is urged by the disk holder urging spring 12, the generating friction force is small even if the disk 9 is placed on the disk holder 4. Therefore, the increase in load torque is small, whereby its detection is difficult. In view of this, the rotation restricting means 5 for restricting the rotation of the disk 9 in case where the disk 9 is abnormally placed on the disk holder 4 is provided at the face of the disk holder 4 that comes in contact with the disk 9.

Figure 10:
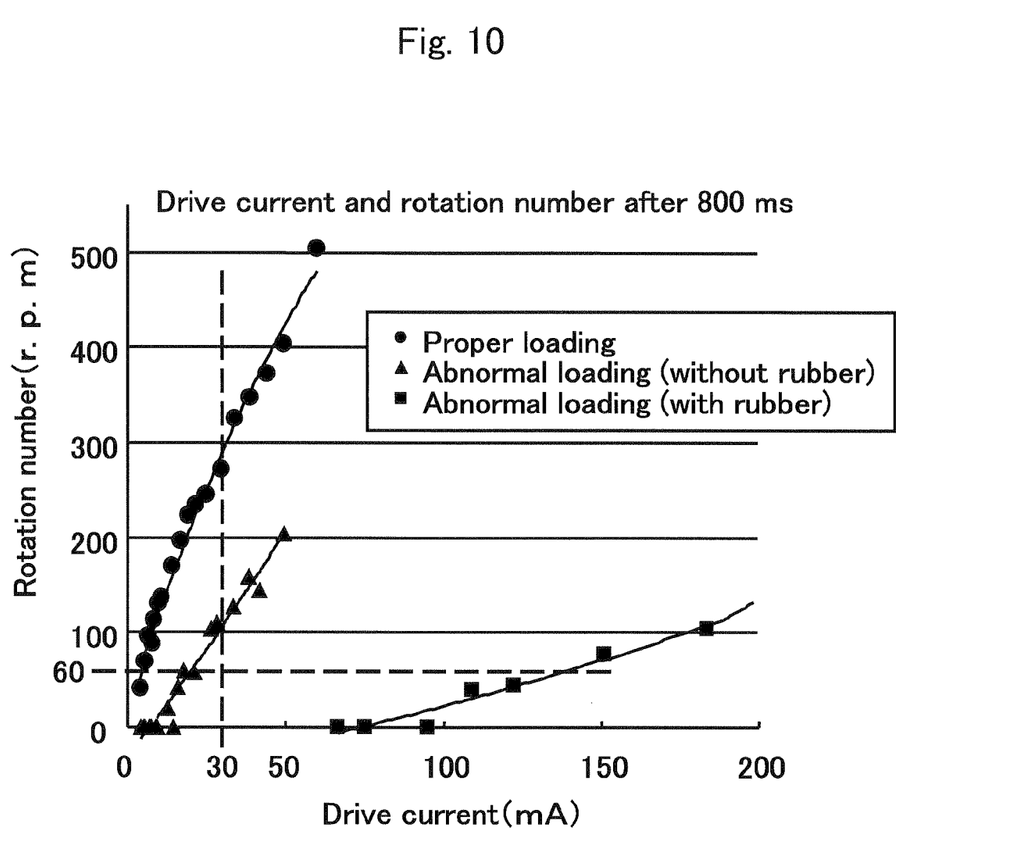
FIG. 10 is a correlation graph showing a relationship between a drive current of a spindle motor and rotation number.

Subsequently explained, is an example in which the rotation number is applied in the previous embodiment. The concept is the same even in the case of torque in the latter embodiment. FIG. 10 is a graph showing a relationship between the drive current of the spindle motor and the rotation number after 800 ms. The graph of FIG. 10 shows the case in which the disk is properly loaded (black circles in the graph), the case in which the disk holder 4 and the disk 9 come in direct contact with each other in the abnormal loading without providing the rubber 5 serving as the rotation restricting means (black triangles in the graph), and the case in which the rubber 5 is provided at the contact section of the disk holder 4 and the disk 9 (black squares in the graph). In the case of the proper loading, the rotation number after 800 ms generally linearly increases passing the origin, reaching about 300 r.p.m. at 30 mA. On the other hand, in case where the rubber 5 is not provided at the contact section between the disk holder 4 and the disk 9 in the abnormal loading, the rotation number is about 120 r.p.m at 30 mA. Supposing that the threshold value is set to 200 r.p.m and the determination is made such that the disk 9 is properly loaded if the rotation number is not less than the threshold value and the disk 9 is abnormally loaded if the rotation number is not more than the threshold value, the determination is fairly possible. However, considering that there is little room for misdetermination and the friction coefficient greatly varies, the accurate determination is practically impossible by this degree of tolerance. On the other hand, in the case of the disk holder 4 having the rubber 5 provided thereto, the friction between the rubber 5 and the disk 9 increases, so that the rotation number is 0 by about 80 mA and it reaches 80 r.p.m at last at about the drive current of 150 mA. Supposing that the drive current is set to 30 mA and the threshold value of the rotation number is set to 60 r.p.m like in the graph, for example. In the proper loading, the rotation number becomes about 300 r.p.m with this drive current, which is in excess of five times the threshold value, so that there is extremely low possibility of erroneously determining the proper loading as the abnormal loading. Further, in the case of the abnormal loading, the drive current is less than a half of the drive current for actually rotating the motor. Therefore, in most cases, the motor does not rotate. Even if the motor rotates, it is not until the motor is driven with a current in excess of four times 30 mA that the rotation number reaches the threshold value, which is 60 r.p.m. Accordingly, there is extremely low possibility of erroneously determining the abnormal loading as the proper loading. Moreover, the rotation number at this time is extremely low, so that the possibility of damaging the disk is extremely low.

The drive current of several hundreds mA commonly flows at the time of normal start of the spindle motor 8. With such great current, the rotation number reaches 1000 r.p.m or more in a short period even in the abnormal loading, leading to damage the disk. However, the determination is made with the motor driven with small current, resulting in being capable of preventing the disk 9 from being damaged. Moreover, small current is advantageous from the viewpoint of tolerance for the misdetermination.

In case where the disk 9 runs over the main bar 2 in the embodiment, the load torque greatly increases as described above, so that the determination is possible without particularly using the rubber 5. However, depending upon a device, the difference between the proper loading and the abnormal loading is small even in case where the spring action is not exerted to the disk 9. Therefore, it is needless to say that there is a case for requiring the rotation restricting means made of a friction member such as a rubber.

The data storing means 19 stores drive current value of 30 mA as the torque data and 60 r.p.m as the data of the rotation number. It is determined whether the disk 9 is properly loaded or not according to whether the rotation number at the point when 800 ms has been elapsed from the start of the spindle motor 8 as counted by the counting means 17 is not less than 60 r.p.m or not.

Eventually, in the embodiment, the detection of the abnormality in the disk loading is performed from the loading operation of the disk 9 until the spindle motor 8 is started for recording or reproduction of the information to the disk 9. The generating torque of the spindle motor 8 upon detecting the abnormal loading is set to torque free from damaging the disk even in the abnormal disk loading state. The rubber 5 serving as the rotation restricting means for restricting the rotation of the disk 9 and having a great friction coefficient for the disk 9 is provided at the contact section between the disk drive and the disk upon the abnormal loading of the disk 9, whereby the disk is not damaged even if the detecting operation is performed with the abnormal disk loading state. Further, the friction load for rotating the disk greatly increases upon the abnormal disk loading state, whereby the difference in the rotation number between the abnormal loading and the proper loading increases. Accordingly, a disk drive surely detecting the abnormality can be obtained.

Although the disk holder is urged by a spring in this embodiment, it may be fixed, not urged by a spring, in a device not using a cartridge. Further, the embodiment explains about the case where the rubber is fitted as the rotation restricting means. However, a material, other than the rubber, having adsorptivity to the disk surface that comes in contact with the rotation restricting means can be applied, such as silicon-based resin, urethane-based resin, soft vinyl chloride resin, or the like. A material having more flexibility than the material of the disk holder is preferable. Further, the loading state is determined according to the rotation number after a predetermined time. However, it may be determined according to the time taken for the motor to reach a fixed rotation number, or according to the drive current for obtaining a predetermined rotation number.

Further, this embodiment takes the configuration wherein the comparing means, control means, counting means, rotation number measuring means and data storing means are individually provided. However, they may be provided as a part of a software or hardware for controlling a popular optical disk device. Moreover, the rotation number measuring means shares an FG (Frequency Generator) generally provided at the spindle motor of the optical disk device for controlling the rotation number. Further, although the determination of the abnormal loading is separately performed from the normal start before the normal start, it may be performed at the beginning of the normal start with the drive torque of the spindle motor set small.

INDUSTRIAL APPLICABILITY

In the information recording/reproducing device according to the present invention, the detection of the abnormal disk loading is performed after the disk loading operation until the disk motor is started for recording or reproducing information to the disk, the generating torque of the disk motor upon detecting the abnormal loading is set to a torque that is free from damaging the disk and is smaller than the generating torque of the rotating means upon the recording or reproduction of information to the disk, and the friction member having a great friction coefficient for the disk is arranged at the contact section of the information recording/reproducing device and the disk upon the abnormal disk loading state. Accordingly, the present invention can be applied to a device that has to surely avoid a damage to a disk, such as DVD recorder, DVD-RAM, DVD-R/RW drive, or the like.

The invention claimed is:

1. An information recording/reproducing device provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, the information recording/reproducing device comprising:

a rotating unit that rotates the disk;

a rotation number measuring unit that measures the rotation number of the rotating unit;

a counting unit that counts an elapsed time from the start of the rotating unit;

a data storing unit that stores beforehand a threshold value for detecting an abnormal loading state of the disk placed on the disk placing section via the holder according to the rotation number of the rotating unit at the time when the elapsed time counted by the counting unit reaches a predetermined time; and a comparing unit that compares the rotation number measured by the rotation number measuring unit and the threshold value stored beforehand in the data storing unit, when the predetermined time has elapsed from the start of the rotating unit, and outputs an abnormality detecting signal when the rotation number is smaller than the threshold value, wherein:

the holder is a disk holder that is urged by a spring in a direction vertical to the placing face of the tray and that is retractable from the placing face of the tray as pushed by a cartridge placed on the placing face of the tray, and a rotation restricting unit that restricts the rotation of the disk by the rotating unit upon the abnormal loading state of the disk is provided at the section of the holder that comes in contact with the disk.

2. The information recording/reproducing device according to claim 1, wherein the rotation restricting unit is made of a material having adsorptivity to the disk when brought into contact with the disk.

3. The information recording/reproducing device according to claim 1, wherein the abnormal loading is detected during the time from the loading operation of the disk to the time when the recording or reproduction of the information is performed to the disk.

4. The information recording/reproducing device according to claim 2, wherein the abnormal loading is detected during the time from the loading operation of the disk to the time when the recording or reproduction of the information is performed to the disk.

5. An information recording/reproducing device provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, the information recording/reproducing device comprising:
 a rotating unit that rotates the disk;
 a torque measuring unit that measures the load torque required by the rotating unit for rotating the disk;
 a counting unit that counts an elapsed time from the start of the rotating unit;
 a data storing unit that stores beforehand a threshold value for detecting an abnormal loading state of the disk placed on the disk placing section via the holder according to the load torque required by the rotating unit at the time when the elapsed time counted by the counting unit reaches a predetermined time; and
 a comparing unit that compares the load torque measured by the torque measuring unit and the threshold value stored beforehand in the data storing unit, when the predetermined time has elapsed from the start of the rotating unit, and outputs an abnormality detecting signal when the load torque is greater than the threshold value, wherein:
 the holder is a disk holder that is urged by a spring in a direction vertical to the placing face of the tray and that is retractable from the placing face of the tray as pushed by a cartridge placed on the placing face of the tray, and
 a rotation restricting unit that restricts the rotation of the disk by the rotating unit upon the abnormal loading state of the disk is provided at the section of the holder that comes in contact with the disk.

6. The information recording/reproducing device according to claim 5, wherein the rotation restricting unit is made of a material having adsorptivity to the disk when brought into contact with the disk.

7. The information recording/reproducing device according to claim 5, wherein the abnormal loading is detected during the time from the loading operation of the disk to the time when the recording or reproduction of the information is performed to the disk.

8. The information recording/reproducing device according to claim 6, wherein the abnormal loading is detected during the time from the loading operation of the disk to the time when the recording or reproduction of the information is performed to the disk.

9. The information recording/reproducing device according to claim 5, wherein the torque measuring unit further measures the generating torque generated by the rotating unit, wherein the generating torque of the rotating unit measured by the torque measuring unit upon detecting the abnormal loading is smaller than the generating torque of the rotating unit upon recording or reproducing the information to the disk.

10. The information recording/reproducing device according to claim 9, wherein the generating torque measured by the torque measuring unit upon detecting the abnormal loading is a torque that is free from damaging the disk upon detecting the abnormal loading.

11. The information recording/reproducing device according to claim 10, wherein the generating torque measured by the torque measuring unit upon detecting the abnormal loading has a value incapable of rotating the disk when the disk is abnormally loaded and capable of rotating the disk when the disk is properly loaded.

12. An information recording/reproducing device provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, the information recording/reproducing device comprising:
 a rotating unit that rotates the disk;
 a rotation number measuring unit that measures the rotation number of the rotating unit;
 a counting unit that counts an elapsed time from the start of the rotating unit;
 a data storing unit that stores beforehand a threshold value for detecting an abnormal loading state of the disk placed on the disk placing section via the holder according to the elapsed time counted by the counting unit from the start of the rotating unit until the rotation number measured by the rotation number measuring unit reaches a fixed rotation number; and
 a comparing unit that compares the elapsed time counted by the counting unit from the start of the rotating unit until the rotation number measured by the rotation number measuring unit reaches a fixed rotation number and the threshold value stored beforehand in the data storing unit, and outputs an abnormality detecting signal when the elapsed time is longer than the threshold value, wherein:
 the holder is a disk holder that is urged by a spring in a direction vertical to the placing face of the tray and that is retractable from the placing face of the tray as pushed by a cartridge placed on the placing face of the tray, and
 a rotation restricting unit that restricts the rotation of the disk by the rotating unit upon the abnormal loading state of the disk is provided at the section of the holder that comes in contact with the disk.

13. An information recording/reproducing device provided with a tray having a disk placing section on which a disk, that is a disk-like recording medium, is placed and a holder that overhangs a part of the disk placing section for holding the disk on the disk placing section with a vertically-installed state, wherein the tray is moved between a loadable/unloadable position of the disk and a position for recording or reproducing information to the disk, the information recording/reproducing device comprising:
 a rotating unit that rotates the disk;
 a rotation number measuring unit that measures the rotation number of the rotating unit;
 a drive current measuring unit that measures drive current corresponding to the rotation number of the rotating unit;
 a data storing unit that stores beforehand a threshold value for detecting an abnormal loading state of the disk placed on the disk placing section via the holder according to the drive current measured by the drive current measuring unit when the rotation number measured by the rotation number measuring unit reaches a predetermined rotation number; and
 a comparing unit that compares the drive current measured by the drive current measuring unit when the rotation number measured by the rotation number measuring unit reaches a predetermined rotation number and the threshold value stored beforehand in the data storing unit, and outputs an abnormality detecting signal when the drive current is greater than the threshold value, wherein:

the holder is a disk holder that is urged by a spring in a direction vertical to the placing face of the tray and that is retractable from the placing face of the tray as pushed by a cartridge placed on the placing face of the tray, and a rotation restricting unit that restricts the rotation of the disk by the rotating unit upon the abnormal loading state of the disk is provided at the section of the holder that comes in contact with the disk.

* * * * *